D. W. WYCHE.
INSULATOR BRACKET.
APPLICATION FILED APR. 16, 1912.
1,041,937.
Patented Oct. 22, 1912.
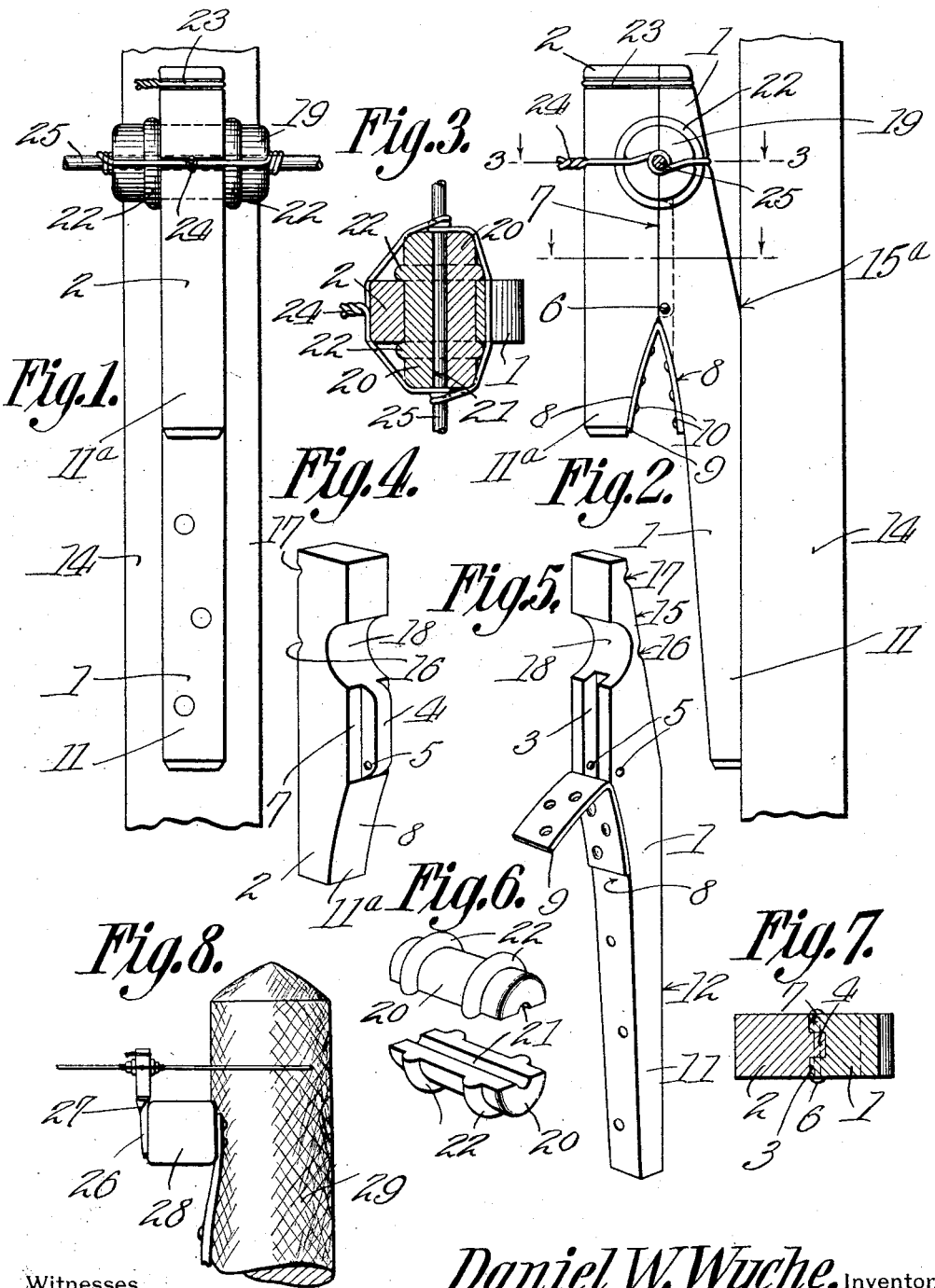
Daniel W. Wyche, Inventor.
by C. A. Snow & Co.
Attorneys
Witnesses

UNITED STATES PATENT OFFICE.

DANIEL WEBSTER WYCHE, OF MARQUEZ, TEXAS.

INSULATOR-BRACKET.

1,041,937.             Specification of Letters Patent.     Patented Oct. 22, 1912.

Application filed April 16, 1912. Serial No. 691,173.

*To all whom it may concern:*

Be it known that I, DANIEL W. WYCHE, a citizen of the United States, residing at Marquez, in the county of Leon and State of Texas, have invented a new and useful Insulator-Bracket, of which the following is a specification.

One object of the present invention is to provide, in an insulator bracket, novel means for connecting and actuating a pair of pivotally connected members to compel the same to grip and hold an insulator.

A further object of the invention is to provide novel means for operatively connecting the gripping members.

The invention aims further to provide an insulator of novel and improved form and to provide gripping members in which the insulator is mounted against movement either longitudinally or transversely.

A further object of the invention is to increase the strength and to enhance the utility of devices of that type to which the present invention appertains.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings,—Figure 1 shows the invention in side elevation; Fig. 2 is an elevation, the view point in Fig. 2 being 90° remote from the view point in Fig. 1; Fig. 3 is a transverse section on the line 3—3 of Fig. 2; Fig. 4 is a detail perspective of the secondary gripping member; and Fig. 5 is a detail perspective of the primary gripping member; Fig. 6 is a perspective of the insulator, the constituent parts thereof being separated; Fig. 7 is a cross section on the line 7—7 of Fig. 6; and Fig. 8 is a side elevation showing a slightly modified form of the invention.

In carrying out the invention there is provided a primary gripping member 1 and a secondary gripping member 2, the inner edge of the primary member 1 being provided with a groove 3 adapted to receive a tongue 4 upon the corresponding face of the secondary member 2. In the tongue 4 and through the body portion of the member 1 there are openings 5 adapted to receive a pivot element 6 whereby the members 1 and 2 may be connected for relative movement, pivotally. The members 1 and 2 are provided above the pivot element 6 with flat, straight, abutting faces 7. Below the pivot element 6, the members 1 and 2 are provided with diverging faces 8, to permit a separation of the upper ends of the members 1 and 2 with the pivot element 6 as a fulcrum. A compression spring 9 is provided, the same having diverging arms engaged with the faces 8 and secured thereto by attaching elements 10.

The shank 11 of the member 1 is longer than the shank 11$^a$ of the member 2, so that the shank 11 may be secured readily to a support 14. The rear face of the shank 11, denoted by the numeral 12, is adapted to be applied to the support 14, the upper portion of the rear face of the member 1 being angularly disposed with respect to the face 12, as indicated at 15, thereby to define a notch 15$^a$ between the upper portion of the member 1 and the support 14. In the outer faces of the parts 1 and 2 there are oppositely disposed grooves or notches 16 and 17. The notches 16 are alined with the axes of notches 18 fashioned in the inner faces of the parts 2 and 1, the notches 18 being located, respectively, above the tongue 4 and above the groove 3.

The invention further includes a two-part insulator, denoted generally by the numeral 19. The insulator 19 comprises parts 20, provided with wire-receiving grooves 21 in their adjacent faces. Outstanding from the outer faces of the parts 20 are ribs 22.

In practical operation, the shank 11 of the member 1 is secured to the support 14. The wire, denoted by the numeral 25, may be lodged in the angle 15$^a$, temporarily. The wire 25 is ultimately received in the grooves 21 of the insulator 19, the insulator 19 being engaged in the mating grooves 18 of the parts 1 and 2. The upper ends of the parts 1 and 2 are held together by means of a tie wire 23 which is mounted in the grooves 17, another tie wire 24 being mounted in the grooves 16, and being engaged around the conductor 25, as clearly shown in the drawings.

As will be understood readily, the spring 9 serves to force the upper ends of the jaws or gripping members 1 and 2 together, to cause the same to hold the insulator 19 in the grooves 18. The tongue 4 registering in the groove 3 serves to prevent the jaws or gripping members 1 and 2 from having lateral movement upon each other. The insulator 19 cannot move longitudinally in the grooves 18 because of the fact that the ribs 22 engage the outer faces of the members 1 and 2. Obviously, by pressing the finger against the lower end of the shank 11ᵃ of the member 2, the upper ends of the members 1 and 2 may be separated to permit the mounting of the insulator 19 in the notches 18.

If desired the device may be modified to the extent indicated in Fig. 8. As there shown, the shank 26 of the primary member is given a quarter twist as shown at 27, so that the structure may be assembled with the cross arm 28 of a supporting pole 29, the device as depicted in Figs. 1 and 2 being adapted to be secured directly to the pole or other support.

Having thus described the invention, what is claimed is:—

1. In a device of the class described, a pair of members pivotally connected intermediate their ends and provided each, adjacent one end, with an opening to receive an insulator, the opposite end of one member projecting beyond the pivotal connection between the members to constitute a manipulating element and being cut away to disclose the corresponding end of the other member, said end of the other member having a bearing face adapted to be secured to a support and defining one of the extreme lateral edges of the device.

2. A device of the class described comprising gripping members pivotally connected intermediate their ends and of unequal lengths, the members being provided adjacent their point of pivotal connection with opposed diverging faces; and a spring comprising diverging arms secured to said faces to cause the members to grip an insulator.

3. In a device of the class described, a pair of members pivotally connected intermediate their ends; a separable insulator held together by said members, adjacent one end of said members; and a spring interposed between the other ends of the members to cause the members to engage the insulator.

4. In a device of the class described, a pair of pivotally connected members provided in their inner faces with coöperating grooves adapted to receive an insulator, there being tie-engaging elements in the outer faces of the members, alined with the axis of the openings defined by the grooves; and means for forcing the grooved ends of the members together.

5. In a device of the class described a pair of members pivotally connected intermediate their ends; a multi-part insulator held between the members at one end of the device; and a compression spring engaged between the members at the opposite end of the device.

In testimony that I claim the foregoing as my own, I have hereto affixed my signature in the presence of two witnesses.

DANIEL WEBSTER WYCHE.

Witnesses:
JAKE WATSON,
TRUMAN KITCHENS.

Copies of this patent may be obtained for five cents each, by addressing the "Commissioner of Patents, Washington, D. C."